July 4, 1961
P. T. MARTIN
2,990,690
ARGON PURIFICATION PROCESS
Filed Oct. 27, 1958
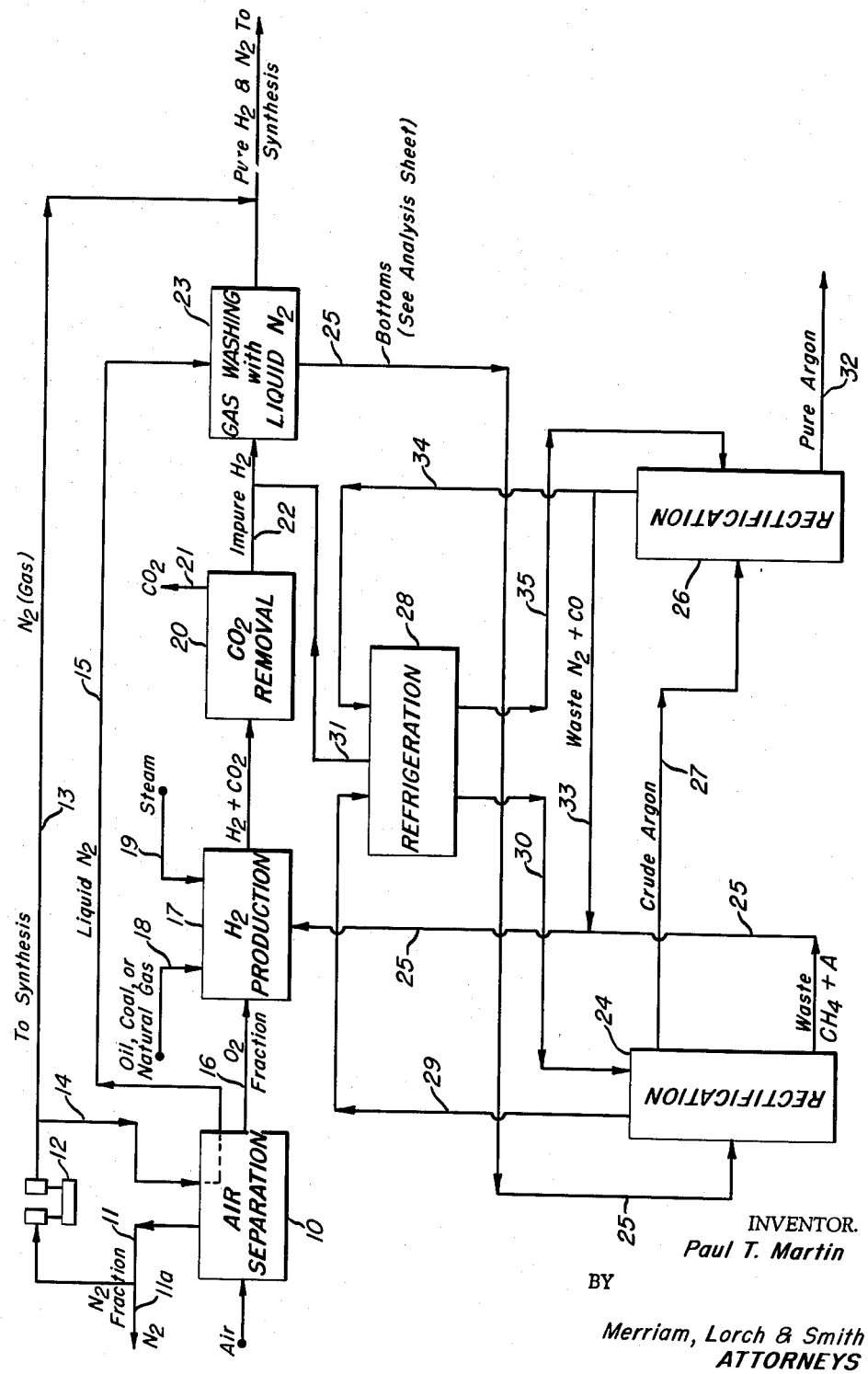
INVENTOR.
Paul T. Martin
BY
Merriam, Lorch & Smith
ATTORNEYS 2,990,690
ARGON PURIFICATION PROCESS
Paul Thomas Martin, Prairie Village, Kans., assignor to Spencer Chemical Company, Kansas City, Mo., a corporation of Missouri
Filed Oct. 27, 1958, Ser. No. 769,722
5 Claims. (Cl. 62—22)

This invention relates to the isolation and separation of argon. It is more specifically concerned with a feed preparation system for the production of argon.

With the development of additional commercial uses, in such processes as "shielded arc" welding and others, the importance of argon as an article of commerce increases and considerable effort is directed to purification techniques for the isolation of pure argon. In general argon is produced on a commercial scale by processes depending upon the liquefaction of air. Because the boiling point is intermediate the boiling points of the main constituents of air the separation of argon is difficult in processing air directly for the recovery of argon. According to this invention it has been found that prefractionation of the air to produce an argon-rich oxygen stream which is subsequently combustively reacted and the resulting reaction effluent fractionated to produce an argon-rich stream employed as feed for an argon purification system has considerable advantages.

FIGURE 1 is a schematic arrangement of a specific embodiment of a feed preparation system employed to produce an argon-rich feed stream which is further processed in conventional argon purification process.

The expanding demands imposed upon agriculture to produce food stuffs for increasing world population from decreasing agricultural acreage has required that the efficiency of the available arable acreage be enhanced. Although modern agricultural equipment helps this need, the judicious use of fertilizers permits a greater return per acre. Nitrogen, phosphorus, and potassium are required in the greatest amounts which severally tax the capacity of natural deposits of inorganic salts containing these elements with a resulting serious depletion of these natural resources. Accordingly there have been developed there have been developed various processes for the synthesis of compounds containing their elements.

With the development of anhydrous ammonia fertilizers (Vide: U.S. Patent 2,285,932) as one of the economical nitrogen carriers, on the basis of cost per pound of contained nitrogen, a number of processes have been developed for the synthesis of ammonia from elemental nitrogen and elemental hydrogen. Although the hydrogen can be derived from a plurality of sources, the principal source of nitrogen is the air. According to this invention it has been found that the tail gas from a feed preparation system for a commercial ammonia synthesis plant can be used to advantage as an argon-rich feed stock for use in an argon purification process.

Referring to the drawing it is seen that air is introduced into a commercial fractional distillation unit 10 for the separation of nitrogen. Being more volatile than oxygen, a gaseous nitrogen fraction generally containing most of the helium and neon present in the air is recovered as overhead and is sent through line 11 to compressor 12 where it is compressed to superatmospheric pressure. If all of the nitrogen is not to be employed in subsequent processing a portion is withdrawn through line 11a and passed to storage or vented, as desired. One portion of the gaseous nitrogen stream passes through line 13 for use in an ammonia synthesis process (not shown). The other portion is returned to air separation unit 10 through line 14 where by conventional heat exchange means it is converted to the liquid state and removed through line 15.

The oxygen fraction containing much of the argon is discharged from air separation unit 10 through line 16 and charged into hydrogen production unit 17 along with suitable amounts of methane and seam introduced through lines 18 and 19 respectively. Through the interreaction of the reactants, there is produced an effluent containing substantial amounts of hydrogen and carbon dioxide, as well as the unreacted feed constituents and partial reaction products such as carbon monoxide. The resulting stream is further processed in gas purification unit 20 where the $CO_2$ constituent is removed by conventional means. The separated $CO_2$ is removed through line 21. The impure $H_2$ effluent leaving gas separation unit 20 through line 22 is countercurrently contacted in gas washing unit 23 with liquid nitrogen introduced through line 15. Pure hydrogen and some nitrogen are recovered as effluent from gas washing unit 23 and combined with the gaseous nitrogen flowing through line 13 to produce a hydrogen and nitrogen containing synthesis gas in a ratio by volume of 3:1 which is processed in suitable conversion equipment (not shown) for the production of synthetic ammonia.

The bottoms from the gas washer 23 are sent to the argon purification process wherein a substantially pure argon fraction is recovered. In this process a series of conventional fractional distillation steps are utilized to effect the recovery of the argon. The feed stream comprising the bottoms fraction from the gas washer 23 is introduced into a first rectification unit 24 through line 25 which produces a bottoms fraction consisting essentially of methane and argon, an intermediate fraction consisting essentially of argon and containing portions of nitrogen and CO, and an overhead fraction consisting essentially of hydrogen, nitrogen and CO. The bottoms fraction is returned to the ammonia synthesis gas preparation process through line 25 to hydrogen production unit 17 where it is reprocessed for the production of hydrogen. The intermediate argon-containing fraction is introduced into the second rectification unit 26 by means of line 27. The overhead fraction is sent to refrigeration unit 28 through line 29 where part of it is liquefied and returned as reflux through line 30, to rectification units 24. The hydrogen which is separated is returned to the aforesaid impure hydrogen stream ahead of gas washing unit 23 through line 31. In second rectification unit 26 the crude argon mixture is fractionated to recover through line 32 a substantially pure argon fraction containing trace amounts of hydrogen, nitrogen, carbon monoxide, oxygen, and methane. A portion of the overhead fraction is returned through lines 33 and 25 to the ammonia synthesis gas preparation process and reprocessed in hydrogen production unit 17 where the carbon monoxide is further reacted with steam to hydrogen and carbon dioxide. The remainder of the overhead fraction is sent to refrigeration unit 28 through line 34 where it is liquefield and returned as reflux through line 35 to rectification unit 26.

The subject invention is primarily concerned with the production of an argon feed gas which can be purified by any suitable purification process concomitant with the fractionation of air to prepare a synthesis gas consisting essentially of elemental hydrogen and nitrogen for use in the production of synthetic ammonia.

According to the process of this invention it is advantageous to employ the tail gas resulting from the liquid nitrogen washing of the resulting stream from the processing of the oxygen fraction from the air separation process to produce hydrogen because:

(1) The main purpose of the air separation plant is to obtain a pure nitrogen gas and oxygen fraction. In taking the feed for an argon purification process off a fractionating column of the air separation plant it is more difficult to obtain the argon than when the nitrogen wash bottoms are used. When taking the argon feed off the air separation plant any upset in the material balances at this point is transmitted through the entire ammonia plant, whereas this does not happen when the instant invention is employed.

(2) When an argon separation unit is added after the ammonia plant is in operation it is much more convenient to install the separation unit taking the feed gas from the bottom of the liquid nitrogen tower than taking it from the air separation unit because of the minimum interruption in ammonia production.

(3) Using the specific hydrogen production unit above described the waste hydrogen, nitrogen, methane and carbon monoxide from the argon separation unit can be recycled to the hydrogen production unit when the feed gas comes from the bottom of the liquid nitrogen tower rather than from the air separation unit. It is possible to get a higher argon recovery by taking the feed off the bottom of the liquid nitrogen wash tower since any argon coming off with the argon separation unit waste gases will be recycled to the hydrogen production unit, pass through the $CO_2$ scrubber, back into the nitrogen wash tower and then to the argon recovery unit, thereby enriching the argon separation unit feed. When using a feed gas off of the air separation unit, the waste gases do not contain enough valuable constituents to be recycled. If the wash tower bottoms were recycled in such a system, because argon is not being separated from the bottoms, the argon that is recycled would build up in the hydrogen synthesis system and pass over into the ammonia synthesis system, greatly reducing its efficiency.

In the synthesis gas preparation process employed in this invention, conventional large scale air distillation plants to produce tonnage nitrogen and oxygen are used such as the Linde process involving the liquefaction of air and its fractional distillation such that most of the argon constituent of the air is contained in the oxygen fraction. Such processes are preferred. However other type plants for the separation of oxygen and nitrogen from the air by chemical or physical means can be used wherein the argon portion of the air feed is contained in the oxygen fraction.

Processing the argon-oxygen fraction into an impure hydrogen stream preferably is done by means of the illustrative reactions utilizing oil, coal, methane, or natural gas, and steam. Other combustion reactions involving the use of oxygen for the purpose, however, can be used which will provide a hydrogen stream containing about not less than 50 mol percent (dry) of hydrogen. The impure hydrogen stream containing large quantities of $CO_2$, depending upon the fuel used, is preferably treated to remove these constituents in conventional gas purification processes using alkanolamines, caustics, etc. to avoid complicating the argon purification process. The resulting impure hydrogen stream is washed with liquid nitrogen. Efficient separation of the hydrogen by means of the liquid nitrogen wash requires counterflow and large interfacial contact between the phases. Accordingly, packed or bubble plate columns are used in this service. To effect the desired separation a ratio of liquid to gas which will provide a minimum amount of entrained hydrogen in the bottoms is used. In the illustrative process employing a packed tower, with a gas rate of impure hydrogen stream of 1,500 pounds/hour, a liquid nitrogen rate of 30 mols/sq. ft. of tower is used.

The bottoms from the hydrogen separation step can then be conventionally processed with expediency to recover the argon fraction. The illustrative fractional distillation steps can be used as well as other alternatives.

In an illustrative embodiment, 315,000 s.c.f.h. of air was fed into an air separation unit to produce 175 mols/hr. of oxygen and 655 mols/hr. of nitrogen. Part of the nitrogen fraction was then compressed to 300 p.s.i.g. and separated into one stream of 250 mols/hr. and a second stream of 80 mols/hr. The second stream was recirculated to the air separation unit and liquefied for subsequent use as a gas wash. The oxygen stream was admixed in a combustion convertor with 300 mols/hr. of methane (as natural gas) and 1500 mols/hr. of steam to produce an impure hydrogen stream at the rate of 750 mols of hydrogen and 280 mols of carbon dioxide per hour as well as trace amounts of oxygen, methane, and carbon monoxide. The carbon dioxide was removed in a conventional DEA (diethanolamine) process and the resulting hydrogen stream at a rate of 284,000 s.c.f.h. was countercurrently contacted with 30 mols of nitrogen (liq.) per hour per sq. ft. of tower which was packed with Raschig rings.

The bottoms which had the following approximate composition:

|  | Mols | Percent |
| --- | --- | --- |
| $H_2$ | 1.0 | 1.0 |
| $N_2$ | 36.0 | 36.0 |
| CO | 45.0 | 45.0 |
| Ar | 11.1 | 11.1 |
| $O_2$ | 0.1 | 0.1 |
| $CH_4$ | 6.9 | 6.9 |
|  | 100.0 | 100.0 | was rectified employing conventional techniques to provide an argon product meeting commercial specifications.

The advantages of the instant invention are apparent from the foregoing discussion and description of the invention. Although the instant invention is specifically illustrated it is evident that a variety of modifications can be made by those skilled in this art without departing from the scope of the invention as defined by the appended claims.

What is claimed is:

1. In a correlated process for the synthesis of ammonia and recovery of argon the steps which comprise introducing atmospheric air into an air liquefaction unit to produce liquid air, fractionally distilling said liquid air to provide an oxygen fraction containing the argon portion of said air and a nitrogen fraction containing nitrogen and the remaining constituents lighter than nitrogen, passing at least a potrion of said nitrogen fraction through said air liquefaction unit to produce a liquid nitrogen stream, combustively reacting the oxygen fraction with suitable reactants to provide a reaction effluent containing substantial portions of hydrogen, contacting said reaction effluent with the liquefied nitrogen stream to separate a fraction containing a major proportion of hydrogen and to provide a bottom fraction containing the remaining portions of the constituents in said reaction effluent including said argon portion, and fractionating said bottom portion to separate a substantially pure argon fraction, reacting at least a portion of said nitrogen fraction with said fraction containing a major portion of hydrogen in an ammonia synthesis process to produce ammonia.

2. In a correlated process for the synthesis of ammonia and recovery of argon the steps which comprise introducing atmospheric air into an air liquefaction unit to produce liquid air, fractionally distilling said liquid air to provide an oxygen fraction containing the argon portion of said air and a nitrogen fraction containing nitrogen and remaining air constituents lighter than nitrogen, passing at least a portion of said nitrogen fraction through said air liquefaction unit to produce a liquid nitrogen stream, combustively reacting the oxygen fraction with methane and steam to provide a reaction effluent containing substantial portions of hydrogen, contacting said reaction effluent with the liquefied nitrogen stream to separate a fraction containing a major proportion of hydrogen and to provide a bottom fraction containing the remaining portions of the constituents in said reaction effluent including said argon portion, and fractionating said bottom portion to separate a substantially pure argon fraction, reacting at least a portion of said nitrogen fraction with said fraction containing a major portion of hydrogen in an ammonia synthesis process to produce ammonia.

3. In a correlated process for the synthesis of ammonia and recovery of argon the steps which comprise introducing atmospheric air into an air liquefaction unit to produce liquid air, fractionally distilling said liquid air to provide an oxygen fraction containing the argon portion of said air and a nitrogen fraction containing nitrogen and remaining air constituents lighter than nitrogen, passing at least a portion of said nitrogen fraction through said air liquefaction unit to produce a liquid nitrogen stream, combustively reacting the oxygen fraction with methane and steam to provide a reaction effluent containing substantial portions of hydrogen and $CO_2$, removing the $CO_2$ from said effluent, contacting the remaining constituents of the effluent with the liquefied nitrogen stream to separate a fraction containing a major proportion of hydrogen and to provide a bottom fraction containing the remaining portions of the constituents in said reaction effluent including said argon portion, and fractionating said bottom portion to separate a substantially pure argon fraction, reaction at least a portion of said nitrogen fraction with said fraction containing a major portion of hydrogen in an ammonia synthesis process to produce ammonia.

4. In a correlated process for the synthesis of ammonia and recovery of argon the steps which comprise introducing atmospheric air into an air liquefaction unit to produce liquid air, fractionally distilling said liquid air to provide an oxygen fraction containing the argon portion of said air and a nitrogen fraction containing nitrogen and remaining air constituents lighter than nitrogen, passing at least a portion of said nitrogen fraction through said air liquefaction unit to produce a liquid nitrogen stream, combustively reacting the oxygen fraction with methane and steam in a convertor to provide a reaction effluent containing substantial portions of hydrogen and $CO_2$, removing the $CO_2$ from said effluent and contacting the remaining constituents of the reaction effluent with the liquefied nitrogen stream to separate a fraction containing a major proportion of hydrogen and to provide a bottom fraction containing the remaining portions of the constituents in said reaction effluent including said argon portion, fractionating said bottom portion in a first fractionator to recover a bottom fraction consisting essentially of methane and argon, an intermediate fraction consisting of a crude argon fraction, and an overhead product consisting essentially of nitrogen, hydrogen, and CO, and fractionating said intermediate fraction to recover a substantially pure argon fraction, reacting at least a portion of said nitrogen fraction with said fraction containing a major portion of hydrogen in an ammonia synthesis process to produce ammonia.

5. In a correlated process for the synthesis of ammonia and recovery of argon the steps which comprise introducing atmospheric air into an air liquefaction unit to produce liquid air, fractionally distilling said liquid air to provide an oxygen fraction containing the argon portion of said air and a nitrogen fraction containing nitrogen and remaining air constituents lighter than nitrogen, passing at least a portion of said nitrogen fraction through said air liquefaction unit to produce a liquid nitrogen stream, combustively reacting the oxygen fraction with methane and steam in a hydrogen production unit to provide a reaction effluent containing substantial portions of hydrogen and $CO_2$, removing the $CO_2$ from said effluent and contacting the remaining constituents of the reaction effluent with the liquefied nitrogen stream to separate a fraction containing a major proportion of hydrogen and to provide a bottom fraction containing the remaining portions of the constituents in said reaction effluent including said argon portion, fractionating said bottom portion in a first fractionator to recover a bottom fraction consisting essentially of methane and argon, an intermediate fraction consisting of a crude argon fraction, and an overhead product consisting essentially of nitrogen, hydrogen, and CO, fractionating said intermediate fraction in a second fractionator to recover a substantially pure argon fraction and a second fraction consisting essentially of nitrogen and CO, and recycling the bottom fraction from said first fractionator and the second fraction from said second fractionator to said hydrogen production unit, reacting at least a portion of said nitrogen fraction with said fraction containing a major portion of hydrogen in an ammonia synthesis process to produce ammonia.

References Cited in the file of this patent

UNITED STATES PATENTS

| | | |
|---|---|---|
| 2,060,940 | Kahle | Nov. 17, 1936 |
| 2,545,778 | Haringhuizen | Mar. 20, 1951 |
| 2,610,106 | Gray | Sept. 9, 1952 |
| 2,909,410 | Fedoroko | Oct. 20, 1959 |

FOREIGN PATENTS

| | | |
|---|---|---|
| 59,877 | Netherlands | 1947 |

OTHER REFERENCES

Chemical Engineering, July 1953, page 133.

UNITED STATES PATENT OFFICE
CERTIFICATE OF CORRECTION

Patent No. 2,990,690                           July 4, 1961

Paul Thomas Martin

It is hereby certified that error appears in the above numbered patent requiring correction and that the said Letters Patent should read as corrected below.

Column 1, line 43, strike out "there have been developed"; column 2, line 6, for "seam" read -- steam --; column 4, line 45, for "potrion" read -- portion --; column 5, line 26, for "reaction" read -- reacting --; column 6, line 46, for "Fedoroko" read -- Fedorko --.

Signed and sealed this 16th day of January 1962.

(SEAL)
Attest:

ERNEST W. SWIDER                          DAVID L. LADD
Attesting Officer                            Commissioner of Patents